United States Patent
Parker et al.

(10) Patent No.: US 7,227,729 B2
(45) Date of Patent: Jun. 5, 2007

(54) ARC FAULT DETECTION TECHNIQUE

(75) Inventors: Michael Parker, Camarillo, CA (US); Christian V. Pellon, Norton, MA (US); Mark D. Rabiner, Cambridge, MA (US); Christopher A. Nicolls, Cumberland, RI (US)

(73) Assignee: Sensata Technologies, Inc., Attleboro, MA (US)

( * ) Notice: Subject to any disclaimer, the term of this patent is extended or adjusted under 35 U.S.C. 154(b) by 0 days.

(21) Appl. No.: 11/225,585

(22) Filed: Sep. 13, 2005

(65) Prior Publication Data

US 2007/0058304 A1    Mar. 15, 2007

(51) Int. Cl.
*H02H 3/00*    (2006.01)
*H02H 9/08*    (2006.01)
*H02H 3/08*    (2006.01)
*H02H 9/02*    (2006.01)

(52) U.S. Cl. .................. 361/42; 361/93.1; 361/93.5; 361/93.6

(58) Field of Classification Search .............. 361/42, 361/93.1, 93.5, 93.6
See application file for complete search history.

(56) References Cited

U.S. PATENT DOCUMENTS 7,003,435 B2 * 2/2006 Kolker et al. ............... 702/185

OTHER PUBLICATIONS

U.S. Appl. No. 10/937,487, filed Sep. 9, 2004 entitled Method for Detecting Arc Faults.
U.S. Appl. No. 10/314,715, filed Dec. 9, 2004 entitled Arc Detection Apparatus and Method.

* cited by examiner

*Primary Examiner*—Stephen W. Jackson
*Assistant Examiner*—Dharti H. Patel
(74) *Attorney, Agent, or Firm*—Russell E. Baumann (57) ABSTRACT

An apparatus and a method of detecting arc faults that have reduced susceptibility to nuisance tripping. The apparatus includes a current sensor, a differential current input sense circuit, a differential current (di/dt) characteristics sense circuit, an absolute current input sense circuit, an absolute current characteristics sense circuit, a power supply, a tripping circuit, a processing unit, and an electromechanical interface. The di/dt characteristics sense circuit provides information relating to the characteristic di/dt signature of a power line current. The absolute current characteristics sense circuit provides information relating to the absolute current waveform characteristics of the power line current. The processing unit correlates the di/dt characteristics to the absolute current characteristics to distinguish between electrical arc faults and nuisance loads, thereby reducing the susceptibility of the apparatus to nuisance tripping.

13 Claims, 4 Drawing Sheets

ARC FAULT DETECTION TECHNIQUE

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to apparatus and methods for detecting arc faults, and more specifically to arc fault detection apparatus and methods that are less susceptible to nuisance tripping.

U.S. patent application Ser. No. 10/937,487 filed Sep. 9, 2004 entitled APPARATUS AND METHOD FOR DETECTING ARC FAULTS (the '487 application) discloses an arc fault circuit interrupter (AFCI) device that can detect and distinguish between electrical arc faults and nuisance loads, and trip a circuit breaker to disconnect power to a load in the event electrical arcing has occurred. Electrical arc faults are generally non-periodic arcing events that may be caused by corroded, worn, aged, or otherwise damaged wiring or wire insulation, and/or faulty electrical connections. For example, electrical arcing can occur between the ends of a two wire conductor, between a conductor and ground, or between respective conductors connected to a load. In contrast, nuisance loads are generally associated with periodic electrical events that may be caused by triac-controlled dimmer circuits, switch-mode power supplies, appliance thermostat switching, drill current transitions, random line voltage spikes, or EMI bursts. Whereas electrical arcing may have the capability of igniting adjacent flammable material and therefore generally constitutes a fire hazard, nuisance loads typically do not create such hazardous conditions. Because the arc fault circuit interrupter disclosed in the '487 application can distinguish between many different types of electrical arc faults and nuisance loads, the AFCI device can disconnect power to a load upon detection of electrical arcing while being less susceptible to nuisance tripping.

Although the above-described arc fault circuit interrupter (AFCI) device has been successfully employed to detect and distinguish between electrical arcing and nuisance loads, there is a need for arc fault detection techniques that have increased reliability. For example, as described in the '487 application, the AFCI device is configured to generate an output that is a function of the differential of the power line current (di/dt). Because different types of electrical arcing typically produce different characteristic di/dt signatures, the AFCI device distinguishes between electrical arcing and nuisance loads based at least in part on characteristics of the differential current such as the di/dt level and the di/dt variation.

However, not only can different electrical arcing types produce different characteristic di/dt signatures, but they can also be associated with different characteristics in the line current waveform. For example, point contact electrical arcing can produce a number of sporadic high-level di/dt events with a large variation from cycle-to-cycle, while being associated with a line current waveform having a high peak-to-RMS current ratio. Further, series electrical arcing can produce an increased number of lower level di/dt events with reduced variation from cycle-to-cycle, while being associated with a line current waveform having a relatively low peak-to-RMS current ratio. Because the above-described AFCI device detects and distinguishes between electrical arcing and nuisance loads based on a consideration of the characteristic di/dt signature without considering the associated line current waveform characteristics, the device may detect what appears to be electrical arcing but instead is merely a nuisance load. This is because the line current waveform characteristics associated with the suspected electrical arc may not match the waveform characteristics normally associated with such arcing. As a result, the AFCI device may be prone to nuisance tripping.

It would therefore be desirable to have improved arc fault detection devices and techniques that avoid the drawbacks of conventional arc fault circuit interrupter (AFCI) devices and techniques.

BRIEF SUMMARY OF THE INVENTION

In accordance with the present invention, an apparatus and a method of detecting arc faults are provided that have reduced susceptibility to nuisance tripping. In one embodiment, the arc fault detection apparatus includes a current sensor, a differential current (di/dt) input sense circuit, a di/dt characteristics sense circuit, an absolute current input sense circuit, an absolute current characteristics sense circuit, a power supply, a tripping (firing) circuit, a processing unit, and an electromechanical interface. In one mode of operation, the current sensor monitors a power line current input comprising an alternating current (AC), and provides high frequency components of the AC current to the di/dt input sense circuit and the absolute current input sense circuit. The di/dt input sense circuit filters and rectifies the AC signal, and provides the rectified signal to the di/dt characteristics sense circuit. The di/dt characteristics sense circuit then provides a voltage level accumulated over a predetermined sampling period, and one or more digital signals indicative of possible electrical arcing during the sampling period, to the processing unit.

The absolute current input sense circuit receives the high frequency components of the AC current at its input, and generates a representation of the power line current therefrom. In one embodiment, the absolute current input sense circuit includes an integrator. The absolute current input sense circuit provides the representation of the power line current to the absolute current characteristics sense circuit, which detects waveform characteristics such as peak, RMS, and/or average values associated with the line current waveform. In one embodiment, the absolute current characteristics sense circuit includes a peak detector, an RMS detector, and/or an average value detector. The absolute current characteristics sense circuit then provides the detected waveform characteristics of the power line current to the processing unit.

The processing unit receives the voltage levels and the digital signals generated by the di/dt characteristics sense circuit, measures the voltage levels, stores information relating to the measured voltages and the digital signals, and processes the stored information using one or more algorithms such as a three cycle algorithm to generate information relating to the characteristic di/dt signature of the line current. The processing unit also receives the waveform characteristics detected by the absolute current characteristics sense circuit, and correlates these waveform character istics to the information relating to the characteristic di/dt signature. In the event the correlation of the di/dt signature and the waveform characteristics is indicative of electrical arcing, the processing unit activates the firing circuit to trip the electromechanical interface, thereby interrupting the power output to the load. In the event of a lack of correlation between the di/dt signature and the waveform characteristics, the processing unit does not trip the electromechanical interface, thereby inhibiting nuisance tripping.

By correlating the di/dt characteristics to the absolute current characteristics of the power line current to distinguish between electrical arc faults and nuisance loads, the arc fault detection apparatus detects arc faults with increased reliability, thereby reducing the susceptibility of the apparatus to nuisance tripping.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which:

FIG. 1b is a schematic diagram illustrating a current sensor, a differential current (di/dt) input sense circuit, a di/dt characteristics sense circuit, a power supply, a tripping (firing) circuit, a reset circuit, a processing unit, and an electromechanical interface included in the arc fault detection apparatus of FIG. 1a;

FIG. 1c is a schematic diagram of the current sensor, the di/dt input sense circuit, and an absolute current input sense circuit included in the arc fault detection apparatus of FIG. 1a; and FIG. 2 is a flow diagram of a method of operating the arc fault detection apparatus of FIG. 1a.

DETAILED DESCRIPTION OF THE INVENTION

An apparatus and a method of detecting arc faults are disclosed that have reduced susceptibility to nuisance tripping. The presently disclosed arc fault detection apparatus detects and distinguishes between electrical arc faults and nuisance loads by correlating the characteristic di/dt signature of the power line current to one or more waveform characteristics of the line current, thereby increasing the reliability of arc fault detection and reducing the susceptibility of the apparatus to nuisance tripping.

Figure 1A:
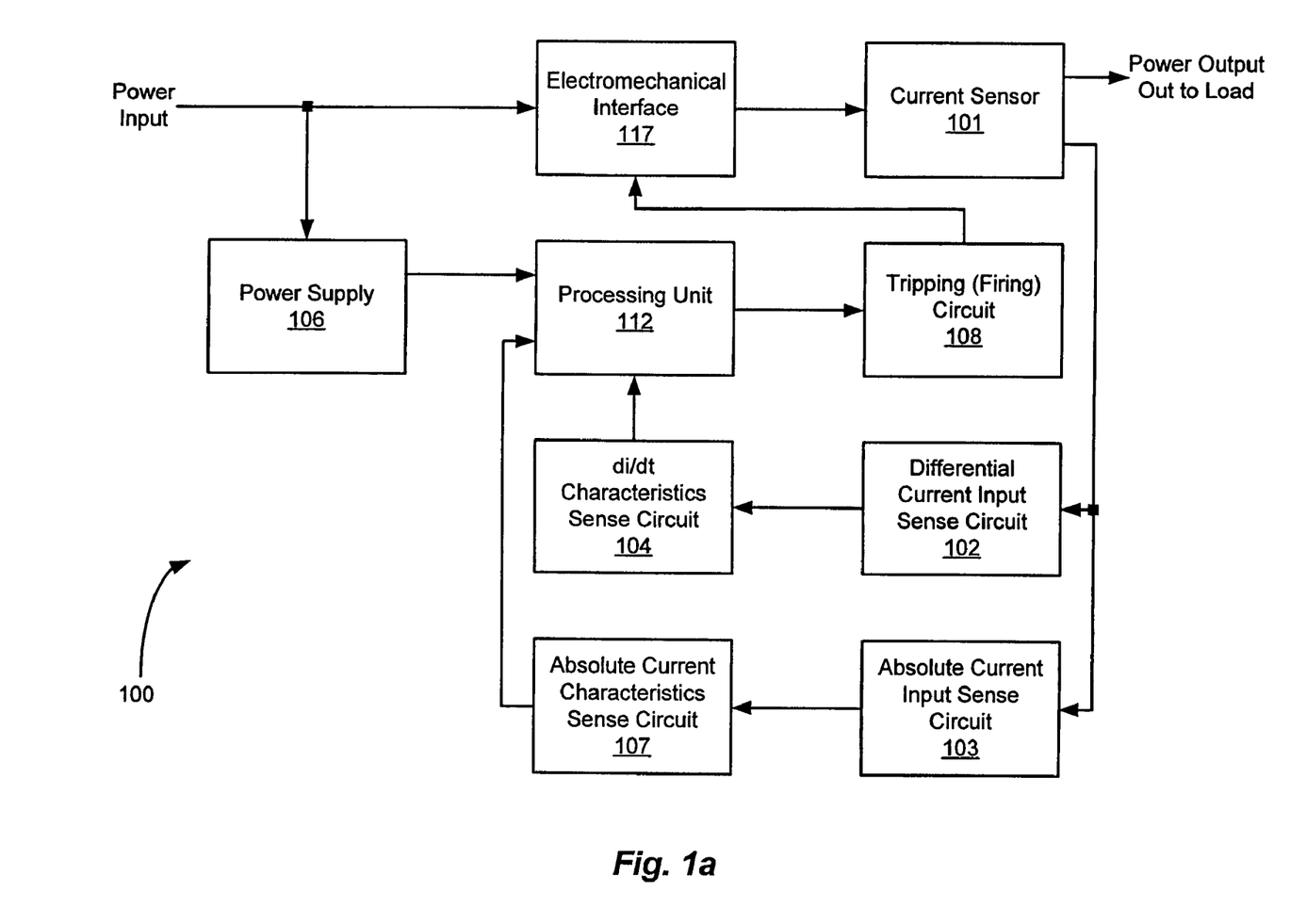
FIG. 1a is a block diagram of an arc fault detection apparatus according to the present invention.

FIG. 1a depicts an illustrative embodiment of an arc fault detection apparatus 100, in accordance with the present invention. In the illustrated embodiment, the apparatus 100 includes a current sensor 101, a differential current (di/dt) input sense circuit 102, an absolute current input sense circuit 103, a di/dt characteristics sense circuit 104, a power supply 106, an absolute current characteristics sense circuit 107, a tripping (firing) circuit 108, a processing unit 112, and an electromechanical interface 117. In an illustrative mode of operation, the current sensor 101 monitors a Power Input including a power line current via the electromechanical interface 117, and provides high frequency components of the Power Input to the di/dt input sense circuit 102 and the absolute current input sense circuit 103. The di/dt input sense circuit 102 filters and rectifies the AC signal at its input, and provides the rectified signal to the di/dt characteristics sense circuit 104. The di/dt characteristics sense circuit 104 is operative to provide voltage levels and digital signals indicative of possible electrical arcing to the processing unit 112.

The absolute current input sense circuit 103 receives the high frequency components of the AC current, and generates a representation of the power line current therefrom. The absolute current input sense circuit 103 provides this representation of the power line current to the absolute current characteristics sense circuit 107, which detects predetermined waveform characteristics such as peak, RMS, and/or average values associated with the line current waveform. The absolute current characteristics sense circuit 107 then provides representations of the detected waveform characteristics to the processing unit 112.

The processing unit 112 receives the voltage levels and the digital signals generated by the di/dt characteristics sense circuit 104, measures the voltage levels, stores information relating to the measured voltages and the digital signals, and processes the stored information using one or more algorithms such as a three cycle algorithm (TCA) to generate information relating to the characteristic di/dt signature of the power line current. The processing unit 112 also receives the waveform characteristics detected by the absolute current characteristics sense circuit 107, and correlates the waveform characteristics to the information relating to the di/dt signature. In the event the correlation of the di/dt signature and the waveform characteristics is indicative of electrical arcing, the processing unit 112 activates the firing circuit 108 to trip the electromechanical interface 117, thereby interrupting the power output to the load. In the event of a lack of correlation between the di/dt signature and the waveform characteristics, the processing unit 112 does not trip the electromechanical interface 117, thereby inhibiting nuisance tripping.

Figure 1B:
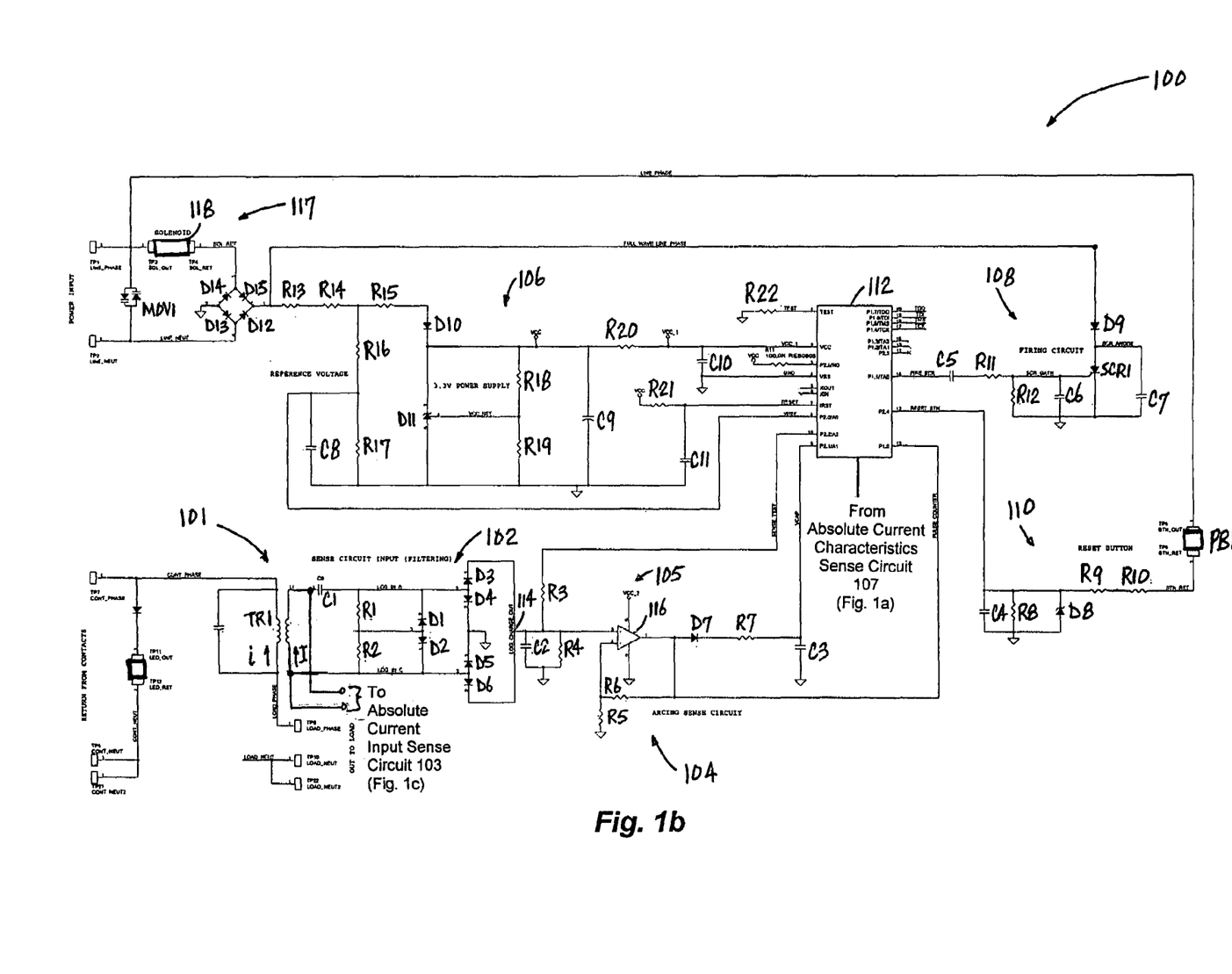

FIG. 1b depicts an illustrative implementation of the current sensor 101, the di/dt input sense circuit 102, the di/dt characteristics sense circuit 104, the power supply 106, the firing circuit 108, a reset circuit 110, the processing unit 112, and the electromechanical interface 117 included in the arc fault detection apparatus 100 (see FIG. 1a). The arc fault detection circuitry illustrated in FIG. 1b is described in U.S. patent application Ser. No. 10/937,487 filed Sep. 9, 2004 entitled APPARATUS AND METHOD FOR DETECTING ARC FAULTS (the '487 application), the entire disclosure of which is incorporated herein by reference. As shown in FIG. 1b, the current sensor 101 includes a transformer TR1, which monitors the Power Input by monitoring an alternating current (AC) i flowing through a load coupleable to the Power Output via a load line phase terminal TP9 and load neutral terminals TP10 and TP22. The transformer TR1 is configured for magnetically coupling the high frequency components of the AC current i from its primary coil to its secondary coil, thereby providing an AC current I to the di/dt input sense circuit 102.

The di/dt input sense circuit 102 includes a capacitor C1, resistors R1-R2, and diodes D1-D6. The secondary coil of the transformer TR1 is connected between the capacitor C1 and the resistor R2. The capacitor C1 is also connected to the resistor R1, and the resistors R1-R2 are connected to ground. The capacitor C1 high pass filters the AC signal provided by the transformer secondary coil, and the resistors R1-R2 provide a ground reference for the secondary coil. The cathode of the diode D1 is connected to the capacitor C1 and the resistor R1, the cathode of the diode D2 is connected to the secondary coil and the resistor R2, and the anodes of the diodes D1-D2 are connected to ground. The cathode of the diode D1 is also connected to the anodes of the diodes D3-D4, and the cathode of the diode D2 is also connected to the anodes of the diodes D5-D6. The cathodes of the diodes D4-D5 are connected to ground, and the cathodes of the diodes D3 and D6 are connected to a node 114 providing the output of the di/dt input sense circuit 102. The diodes D1-D2 and D4-D5 are configured to form a full wave rectified bridge, and therefore the output provided at the node 114 is a full wave rectified signal. Further, the diodes D3-D6 and a capacitor C2 included in the di/dt characteristics sense circuit 104 form a logging circuit, thereby causing the level of the output provided at the node 114 to be proportional to the log of the input of the di/dt input sense circuit 102.

The di/dt characteristics sense circuit 104 includes the capacitor C2, an integrating capacitor C3, resistors R3-R7, an operational amplifier (op amp) 116, and a diode D7. As shown in FIG. 1b, the capacitor C2 and the resistor R4 are connected between the node 114 and ground. Further, the resistor R3 is connected between the node 114 and an output of the processing unit 112. The op amp 116 and the resistors R5-R6 are configured to form a non-inverting amplifier 105. The capacitor C2 is connected to the non-inverting input of the op amp 116, and the voltage across the capacitor C2 is buffered and provided to the integrating capacitor C3 via the diode D7 and the resistor R7. The capacitor C3 is connected between an input of the processing unit 112 and ground. The diode D7 is configured to prevent reverse current flow from the capacitor C3. Moreover, the combination of the resistor R7 and the capacitor C3 forms a low pass filter to filter out high frequency noise.

It is noted that the voltage across the capacitor C2 resets with a decay time of about $(C2)*(R4)$ seconds. For example, if R4 equals 10 kΩ and the capacitor C2 equal 1 nf, then the decay time of the capacitor C2 is about 10 μsec. The di/dt characteristics sense circuit 104 is configured to convert a change in voltage across the capacitor C2 ($\Delta V_{C2}$) into a pulse having a width tpw, which may be determined from $$G*\Delta V_{C2}*e^{(-tpw/C2*R4)}=Vcc/2, \quad (1)$$

in which "G" is the gain of the op amp 116. Each pulse generated in response to a significant di/dt event causes a change in voltage across the capacitor C3 ($\Delta V_{C3}$), which may be expressed as $$\Delta V_{C3}=(Vcc-Vbe-V_{C3})*(1-e^{(-tpw/C3*R7)})-V_{C3}. \quad (2)$$

Accordingly, equations (1)–(2) demonstrate that as the number of di/dt events increases, $\Delta V_{C3}$ increases with the log of $\Delta V_{C2}$, thereby increasing the dynamic range of the arc fault detection apparatus 100.

The processing unit 112 is operative to take measurements of the voltage $V_{C3}$ across the integrating capacitor C3. For example, the processing unit 112 may be implemented using the MSP430F1122 micro-controller sold by Texas Instruments Inc. (TI), Dallas, Tex., USA, or any other suitable processor/controller. In one embodiment, the processing unit 112 measures the voltage $V_{C3}$ across the capacitor C3 once each half cycle of the line voltage near the line voltage zero crossing. The measured voltages represent the sum of voltages accumulated by the integrating capacitor C3, which is reset via a simple decay time. Accordingly, a sampling period during which each measurement is made has a duration starting when a di/dt event occurs and lasting for about a decay time.

In an alternative embodiment, the processing unit 112 measures the voltage $V_{C3}$ across the integrating capacitor C3 multiple times per half cycle of the line voltage. For example, the processing unit 112 may measure the voltage $V_{C3}$ twice each half cycle at times determined by the absolute value of the line voltage, and reset the capacitor C3 to 0 volts following each measurement. Specifically, the processing unit 112 measures the voltage $V_{C3}$ at times corresponding to two predetermined regions of each half cycle. The processing unit 112 then sums these measurements by first resetting the capacitor C3 to 0 volts at the beginning of each predetermined region, and then measuring the capacitor voltage at the end of each region. In the preferred embodiment, both voltage measurements per half cycle are made near the line voltage zero crossing, e.g., one measurement is made just before the zero crossing, and the other measurement is made just after the zero crossing.

In the presently disclosed embodiment, the input of the processing unit 112 that is connected to the capacitor C3 is also connected to an analog-to-digital converter (ADC) within the processing unit 112. The ADC converts the analog voltage measurements taken across the integrating capacitor C3 to digital data, thereby allowing the processing unit 112 to store the measurement data in internal memory. Following each measurement, the processing unit 112 shorts the input to ground to prepare the capacitor C3 to integrate current for the next sampling period. In addition, the op amp 116 provides a pulse counter signal to an input of the processing unit 112, which employs an internal counter to monitor the pulse counter signal to keep track of pulses occurring in the signal. The processing unit 112 then stores data relating to the measured voltages and the monitored pulses, and processes the data using one or more algorithms such as the three cycle algorithm (TCA) to generate information relating to the characteristic di/dt signature of the power line current.

The reset circuit 110 includes a capacitor C4, resistors R8-R10, a zener diode D8, and a pushbutton PB1 operable to connect the line phase to an input of the processing unit 112. In the illustrated embodiment, the serially connected resistors R9-R10 and the resistor R8 reduce the line voltage and the line current to levels suitable for the processing unit 112. The zener diode D8 is connected in parallel with the resistor R8 to provide a redundant voltage limitation. The capacitor C4 is also connected in parallel with the resistor R8 to filter out high frequency noise. When the pushbutton PB1 is actuated to initiate a test, the processing unit 112 provides a sense test signal having an increasing pulse width at its output connected to the resistor R3. As a result, the processing unit 112 applies increasing voltage to the capacitor C2 through the resistor R3 as the width of the pulse increases, thereby creating simulated electrical arcing at varying voltages.

The firing circuit 108 includes capacitors C5-C7, resistors R11-R12, a diode D9, and a silicon controlled rectifier (SCR1). Specifically, the capacitor C7 is connected between the anode and the cathode of the SCR1, and the capacitor C6 and the resistor R12 are connected between the gate and the cathode of the SCR1 to prevent an unintentional turn-on of the SCR1 by a significant dv/dt event. The capacitor C5 is serially connected between an input of the processing unit 112 and the current limiting resistor R11 to prevent excessive depletion of the power supply. The electromechanical interface 117 includes a diode bridge including diodes D12-D15, a solenoid 118, and a metal oxide varistor (MOV1) connected between the line neutral and line phase terminals to prevent excessive lien voltage. The diode D9 is connected between the diode bridge D12-D15 and the anode of the SCR1. The diode D9 isolates the capacitor C7 from a line voltage monitoring circuit including the resistors R16-

R17 and the capacitor C8. Accordingly, when the SCR1 is turned on, the SCR1 draws increased current through the diode bridge D12-D15, and a voltage level approximately equal to the line voltage trips the solenoid 118 to disconnect the Power Output from the load.

The power supply 106 includes resistors R13-R20, capacitors C8-C10, and diodes D10-D11. The serially connected resistors R13-R15 limit the amount of current provided to the zener diode D11. As shown in FIG. 1b, the resistor R20 is connected between the junction of the diode D10 and the zener diode D11 and the positive supply Vcc of the processing unit 112. The diode D10 prevents reverse current flow from the capacitor C9, which is connected between the junction of the diodes D10-D11 and ground. The serially connected resistors R16-R17 are connected between the junction of the resistors R14-R15 and ground. The capacitor C8, which is connected between the junction of the resistors R16-R17 and ground, provides a reference voltage (VREF) to the processing unit 112. The reference voltage VREF is proportional to the voltage of the diode bridge D12-D15, which is approximately equal to the absolute value of the line voltage. In the presently disclosed embodiment, the processing unit 112 monitors the line voltage via VREF, and determines when to perform measurements of the voltage across the capacitor C3 based on the monitored line voltage. In an alternative embodiment, the processing unit 112 monitors the output of a digital timer, and performs voltage measurements across the integrating capacitor C3 based on the timer output.

Figure 1C:
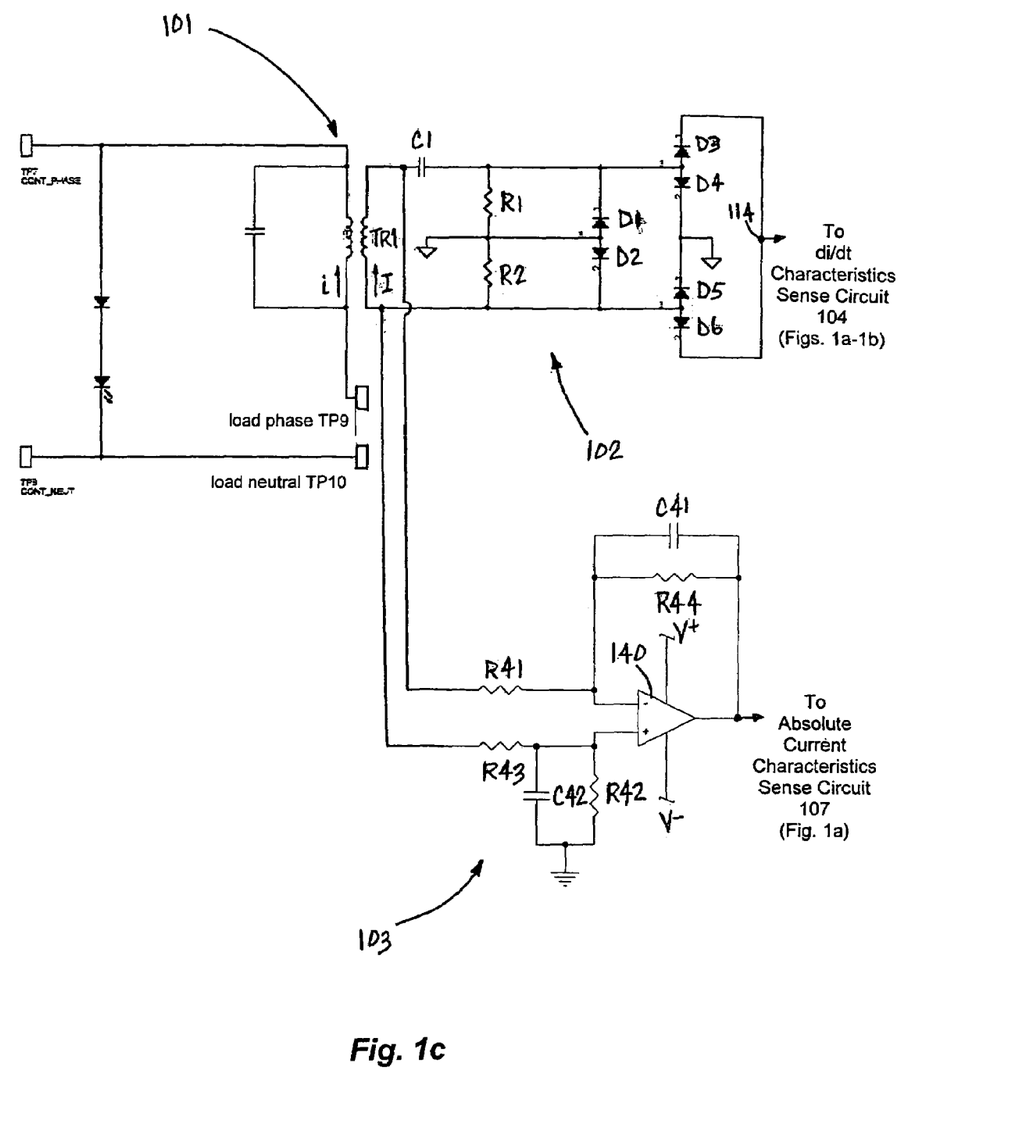

FIG. 1c depicts the current sensor 101, the di/dt input sense circuit 102, and the absolute current input sense circuit 103 included in the arc fault detection apparatus 100 (see FIGS. 1a–1b). As described above, the absolute current input sense circuit 103 is operative to receive the high frequency components of the Power Input at its input, and to generate a representation of the power line current therefrom. It should be understood that the absolute current input sense circuit 103 of FIG. 1c is described herein for purposes of illustration, and that other suitable implementations of the sense circuit 103 may be employed.

As shown in FIG. 1c, the absolute current input sense circuit 103 comprises an integrator including an op amp 140, resistors R41-R44, and capacitors C41-C42. In the preferred embodiment, the resistors R41 and R43 have the same value, the capacitors C41-C42 have the same value, and the resistors R42 and R44 have the same value. The values of the resistors R41 and R43 and the capacitors C41-C42 are selected to set the gain of the sense circuit 103 to a suitable level. Suitable values of the resistors R42 and R44 are also selected to prohibit offset voltages from being integrated into the output of the sense circuit 103, thereby potentially causing the op amp 140 to become saturated. It is appreciated that the values of the resistors R41 and R43 included in the absolute current input sense circuit 103, and the values of the resistors R1-R2 included in the di/dt input sense circuit 102, should be selected to assure that the respective sense circuits 102-103 present suitable loads to the current sensor 101. In addition, the values of the resistors R42, R44 and the capacitors C41-C42 should be selected so that the time constants corresponding to the resistor-capacitor pairs R44, C41 and R42, C42 are longer than the period of the power line current.

As shown in FIG. 1c, the input of the absolute current input sense circuit 103 is connected across the secondary coil of the transformer TR1. Specifically, an input terminal of the resistor R41 is connected between the secondary coil and the capacitor C1, and an input terminal of the resistor R43 is connected between the secondary coil and the resistor R2. The absolute current input sense circuit 103 integrates the high frequency components of the Power Input (which are a function of di/dt), and provides a representation of the power line current to the absolute current characteristics sense circuit 107.

As described above, the absolute current characteristics sense circuit 107 (see FIG. 1a) is operative to detect characteristics such as peak, RMS, and/or average values associated with the waveform of the power line current. Examples of circuitry suitable for use in the absolute current characteristics sense circuit 107 include, but are not limited to, peak detectors, RMS detectors, average value detectors, rectifiers, etc. The absolute value characteristics sense circuit 107 provides representations of the detected waveform characteristics of the power line current, e.g., the peak, RMS, and/or average values, to the processing unit 112.

The processing unit 112 receives the voltage levels and digital signals provided by the di/dt characteristics sense circuit 104, measures the voltage levels, stores information relating to measured voltages and the digital signals, and processes the stored information using one or more algorithms such as the three cycle algorithm (TCA) to generate information relating to the characteristic di/dt signature of the power line current. In one embodiment, the TCA is executed to determine voltage fluctuations that cancel disturbances caused by nuisance loads of the type that are repetitive or continuously varying. The TCA may be expressed as $$TCA = |(|V_{[n-1]} - V_{[n]}| + |V_{[n+1]} - V_{[n]}| - |V_{[n-1]}|)|, \quad (3)$$

in which V[n−1] represents a first voltage measurement corresponding to a first cycle of the line voltage, V[n] represents a second voltage measurement corresponding to a second cycle of the line voltage, and V[n+1] represents a third voltage measurement corresponding to a third cycle of the line voltage. The processing unit 112 is further operative to process the stored information using a pulse counter algorithm for counting the number of possible arcing events during each half cycle of the lien voltage, a pulse counter algorithm for capturing timing information relating to one or more possible arcing events, and an arcing event counter algorithm for counting the number of possible arcing events included in at least one running sum of voltage measurements. Each of the algorithms executed by the processing unit 112 to obtain information relating to the characteristic di/dt signature of the power line current is described in the above-referenced '487 application.

As shown in FIG. 1b, the processing unit 112 also receives the waveform characteristics detected by the absolute current characteristics sense circuit 107 (e.g., the peak, RMS, and/or average values). The processing unit 112 correlates the absolute current waveform characteristics to the information relating to the characteristic di/dt signature to determine whether the di/dt characteristics and the absolute current characteristics correspond to the same type of electrical arcing. It is noted that different electrical arcing types can produce different characteristic di/dt signatures, and can be associated with different characteristics of the line current waveform. For example, point contact electrical arcing can produce a number of sporadic high-level di/dt events with a large variation from cycle-to-cycle, while being associated with a line current waveform having a high peak-to-RMS current ratio. Further, series electrical arcing can produce an increased number of lower level di/dt events with reduced variation from cycle-to-cycle, while being associated with a line current waveform having a relatively low peak-to-RMS current ratio. By correlating the di/dt characteristics to the absolute current characteristics of the power line current, and distinguishing between electrical arc faults and nuisance loads based on the correlation, the processing unit 112 can detect electrical arcing with increased sensitivity and improved false trip immunity.

For example, if it were determined that the di/dt characteristics and the absolute current characteristics of the power line current are both indicative of a point contact arc, then the processing unit 112 would activate the firing circuit 108 to trip the electromechanical interface 117, thereby interrupting the power output to the load. However, if one of the di/dt characteristics and the absolute current characteristics is indicative of a point contact arc while the other one is not consistent with such arcing, then the suspected electrical arc would likely be caused by a nuisance load. In this case, the processing unit 112 would not trip the electromechanical interface 117.

Figure 2:
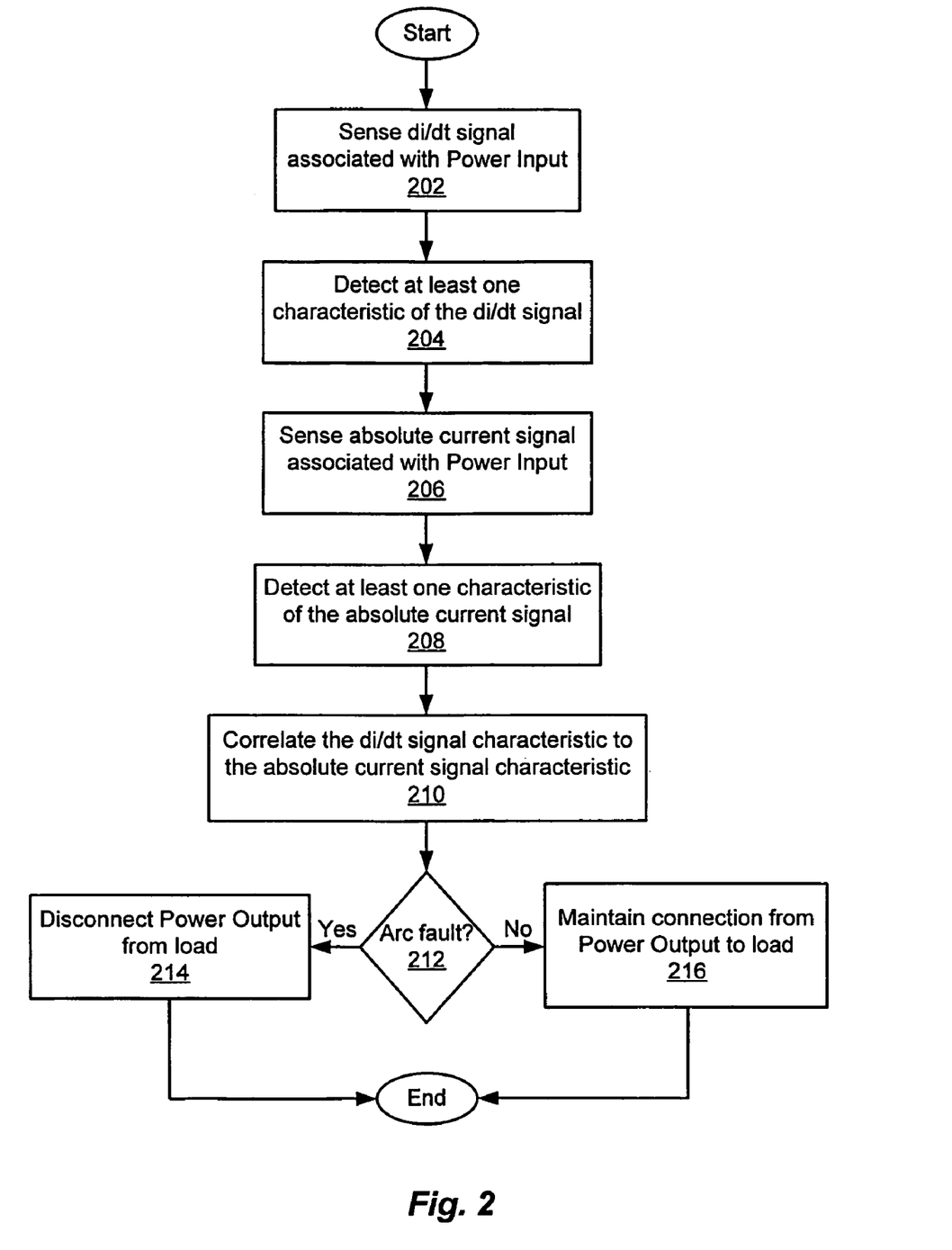

A method of operating the presently disclosed arc fault detection apparatus is illustrated by reference to FIGS. 1a and 2. As depicted in step 202, a differential current (di/dt) signal associated with the Power Input is sensed by the differential current input sense circuit 102. At least one characteristic of the di/dt signal is then detected by the di/dt characteristics sense circuit 104, as depicted in step 204. Next, an absolute current signal associated with the Power Input is sensed by the absolute current input sense circuit 103, as depicted in step 206. At least one characteristic of the absolute current signal is then detected by the absolute current characteristics sense circuit 107, as depicted in step 208. Next, the di/dt signal characteristic is correlated to the absolute current signal characteristic by the processor 112, as depicted in step 210. A determination is then made by the processor 112 as to whether the characteristics of the di/dt signal and the absolute current signal are indicative of an arc fault based on the correlation, as depicted in step 212. In the event it is determined that the characteristics of the di/dt signal and the absolute current signal are indicative of an arc fault, an electromechanical interface is tripped to disconnect the Power Output from a load by the electromechanical interface, as depicted in step 214. Otherwise, the electromechanical interface is not tripped, thereby maintaining the connection from the Power Output to the load, as depicted in step 216.

Having described the above illustrative embodiments, other alternative embodiments or variations may be made. For example, it was described that the absolute current input sense circuit 103 includes an integrator circuit. In an alternative embodiment, the integrator circuit may be replaced with an RC network. Further, the output of the RC network may be digitized to allow the processing unit 112 to derive information relating to the waveform characteristics of the power line current therefrom. In another embodiment, the absolute current characteristics sense circuit 107 may include a comparator configured to receive the output of the RC network, and to provide an output indicating whether the line current exceeded a predefined threshold level, the length of time the line current exceeded the threshold level, and/or the number of times the line current exceeded the threshold level. This information may form the basis for additional discrimination by the processing unit 112 based on the general characteristics of current flow.

In addition, it should be appreciated that the functions necessary to implement the arc fault detection apparatus 100 may be embodied in whole or in part using hardware or software or some combination thereof using digital signal processors, microcontrollers, microprocessors, programmable logic arrays, or any other suitable hardware and/or software.

It will further be appreciated by those of ordinary skill in the art that further modifications to and variations of the above-described arc fault detection technique may be made without departing from the inventive concepts disclosed herein. Accordingly, the invention should not be viewed as limited except as by the scope and spirit of the appended claims.

What is claimed is:

1. Arc fault detection apparatus, comprising:
a power input configured to monitor a power line current;
a differential current input sense circuit operative to sense a differential current (di/dt) signal associated with the line current;
a differential current characteristics sense circuit operative to detect at least one characteristic of the di/dt signal,
wherein the at least one characteristic of the di/dt signal includes a level associated with a plurality of di/dt events, and a variation with time of the plurality of di/dt events over a specified number of cycles of the line current;
an absolute current input sense circuit operative to sense an absolute current signal associated with the line current;
an absolute current characteristics sense circuit operative to detect at least one characteristic of the absolute current signal,
wherein the at least one characteristic of the absolute current signal includes a peak level and an RMS level of the line current; and
a processor operative to receive representations of the at least one characteristic of the di/dt signal and the at least one characteristic of the absolute current signal, and to determine whether the characteristics of the di/dt and absolute current signals are indicative of an arc fault based on the level associated with the plurality of di/dt events, the variation with time of the plurality of di/dt events over the specified number of current cycles, and a ratio of the peak level and the RMS level of the line current.

2. The apparatus of claim 1 further including a power output and an electromechanical interface coupled between the power input and the power output, wherein the processor is further operative, in the event the characteristics of the di/dt and absolute current signals are indicative of an arc fault, to trip the electromechanical interface, thereby disconnecting the power output from a load coupleable thereto.

3. The apparatus of claim 2 wherein the electromechanical interface comprises a solenoid.

4. The apparatus of claim 1 wherein the absolute current input sense circuit includes an integrator.

5. The apparatus of claim 1 wherein the absolute current characteristics sense circuit includes circuitry selected from the group consisting of a peak detector, an RMS detector, and an average value detector.

6. The apparatus of claim 1 wherein the at least one absolute current signal characteristic is selected from the group consisting of the peak level of the line current, the RMS level of the line current, and an average value of the line current.

7. A method of detecting an arc fault, comprising the steps of:
monitoring a power line current;
sensing a differential current (di/dt) signal associated with the line current;
detecting at least one characteristic of the di/dt signal, wherein the at least one characteristic of the di/dt signal includes a level associated with a plurality of di/dt events, and a variation with time of the plurality of di/dt events over a specified number of cycles of the line current;
sensing an absolute current signal associated with the line current;
detecting at least one characteristic of the absolute current signal, wherein the at least one characteristic of the absolute current signal includes a peak level and an RMS level of the line current; and
in a determining step, determining whether the characteristics of the di/dt and absolute current signals are indicative of an arc fault based on the level associated with the plurality of di/dt events, the variation with time of the plurality or di/dt events over the specified number of current cycles, and a ratio of the peak level and the RMS level of the line current.

8. The method of claim 7 further including the step of, in the event the characteristics of the di/dt and absolute current signals are indicative of an arc fault, tripping an electromechanical interface to disconnect a power output from a load.

9. The method of claim 7 wherein the at least one absolute current signal characteristic is selected from the group consisting of the peak level of the line current, the RMS level of the line current, and an average value of the line current.

10. The apparatus of claim 1 wherein the processor is operative to determine an occurrence of point contact electrical arcing by detecting a specified number of high-level di/dt events having a specified large variation with time from cycle-to-cycle of the line current in association with a specified high peak-to-RMS ratio of the line current.

11. The apparatus of claim 1 wherein the processor is operative to determine an occurrence of series electrical arcing by detecting a specified number of low-level di/dt events having a specified low variation with time from cycle-to-cycle of the line current in association with a specified low peak-to-RMS ratio of the line current.

12. The method of claim 7 wherein the determining step includes determining an occurrence of point contact electrical arcing by detecting a specified number of high-level di/dt events having a specified large variation with time from cycle-to-cycle of the line current in association with a specified high peak-to-RMS ratio of the line current.

13. The method of claim 7 wherein the determining step includes determining an occurrence of series electrical arcing by detecting a specified number of low-level di/dt events having a specified low variation with time from cycle-to-cycle of the line current in association with a specified low peak-to-RMS ratio of the power line current.

* * * * *